(12) United States Patent
Frühauf et al.

(10) Patent No.: US 12,492,794 B2
(45) Date of Patent: Dec. 9, 2025

(54) COVER LENS, INJECTION MOULDING PROCESS, INJECTION MOULD, MOTOR VEHICLE LIGHT AND MOTOR VEHICLE

(71) Applicant: ZKW Group GmbH, Wieselburg (AT)

(72) Inventors: Johannes Frühauf, Lunz am See (AT); Jürgen Aichinger, Ybbs an der Donau (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/980,597

(22) Filed: Dec. 13, 2024

(65) Prior Publication Data

US 2025/0198584 A1    Jun. 19, 2025

(30) Foreign Application Priority Data

Dec. 15, 2023  (EP) ..................................... 23217124

(51) Int. Cl.
*F21S 41/20* (2018.01)
*B29C 45/16* (2006.01)
(Continued)

(52) U.S. Cl.
CPC .......... *F21S 41/2805* (2024.05); *B29C 45/16* (2013.01); *B29C 45/26* (2013.01); *B32B 27/08* (2013.01); *B32B 27/308* (2013.01); *B32B 27/365* (2013.01); *B32B 27/40* (2013.01); *B29K 2033/12* (2013.01); *B29K 2069/00* (2013.01);
(Continued)

(58) Field of Classification Search
CPC ...... F21S 41/2805; B29C 45/16; B29C 45/26; B32B 27/08; B32B 27/308; B32B 27/365; B32B 27/40
See application file for complete search history.

(56) References Cited

U.S. PATENT DOCUMENTS

2014/0295129 A1* 10/2014 Lux .................... B29C 45/1671
264/129
2015/0306801 A1* 10/2015 Ito ............................ B29C 45/16
428/137
(Continued)

FOREIGN PATENT DOCUMENTS

EP        3878620 A1    9/2021

OTHER PUBLICATIONS

Extended European Search Report for European Patent Application No. 23217124.9 dated May 17, 2024 (7 Pages).

*Primary Examiner* — Thomas M Sember
(74) *Attorney, Agent, or Firm* — Eversheds Sutherland (US) LLP (57) ABSTRACT

Cover lens (1), for a motor vehicle light, wherein the cover lens (1) has an inner surface (2), an outer surface (3) opposite the inner surface (2), a transparent body (4), an opaque body (5) and a coating (6), wherein the coating (6) has PU polyurethane, wherein the transparent body (4), the opaque body (5) and the coating (6) are produced in one continuous piece, preferably in an injection moulding process, in such a way that the outer surface (3) is only formed on the coating (6) and on the opaque body (5), wherein the coating (6), as seen from the outer surface (3) in the direction of the inner surface (2), completely covers the transparent body (4) and only partially covers the opaque body (5). Injection moulding process and injection mould (100) for producing a cover lens (1).

15 Claims, 3 Drawing Sheets

(51) Int. Cl.
    *B29C 45/26*        (2006.01)
    *B29K 33/00*        (2006.01)
    *B29K 69/00*        (2006.01)
    *B29K 75/00*        (2006.01)
    *B29L 31/00*        (2006.01)
    *B29L 31/30*        (2006.01)
    *B32B 27/08*        (2006.01)
    *B32B 27/30*        (2006.01)
    *B32B 27/36*        (2006.01)
    *B32B 27/40*        (2006.01)

(52) U.S. Cl.
    CPC .. *B29K 2075/00* (2013.01); *B29K 2995/0025* (2013.01); *B29K 2995/0026* (2013.01); *B29L 2031/30* (2013.01); *B29L 2031/747* (2013.01); *B32B 2250/03* (2013.01); *B32B 2250/24* (2013.01); *B32B 2307/41* (2013.01); *B32B 2307/412* (2013.01); *B32B 2605/00* (2013.01)

(56)                 References Cited

U.S. PATENT DOCUMENTS 2019/0184614 A1     6/2019   Benyahia et al.
2020/0003389 A1*   1/2020   Ho ........................... F21S 43/26

\* cited by examiner

COVER LENS, INJECTION MOULDING PROCESS, INJECTION MOULD, MOTOR VEHICLE LIGHT AND MOTOR VEHICLE

CROSS-REFERENCE TO RELATED APPLICATIONS

This application claims priority to European Patent Application No. 23217124.9, filed Dec. 15, 2023, which is incorporated herein by reference.

TECHNICAL FIELD

The invention relates to a cover lens for a motor vehicle light, wherein the cover lens has an inner surface, an outer surface opposite the inner surface, a transparent body, an opaque body and a coating, wherein the coating comprises PU polyurethane.

BACKGROUND

Such a cover lens may be connected, for example screwed, locked or preferably at least bonded to the housing to form a closed space with the housing. Such cover lenses are well known and have to meet certain requirements in particular when used in a motor vehicle light. First of all, such cover lenses must be transparent to visible light at least in sections. Secondly, such cover lenses should meet aesthetic requirements, which is why an opaque body and a transparent body are usually moulded together such that at least part of the cover lens appears clear and is transparent to visible light. Furthermore, coatings are used in particular to make the transparent area of such cover lenses resistant at least to scratches, chemicals or ultraviolet light to a certain extent.

In addition to hard coatings, which are processed in paint form with appropriate solvents, coatings have also become known which comprise polyurethane or PU for short in order to protect such cover lenses. The advantage of such a coating made of PU polyurethane is in particular the potential integration of the coating process into fully automated injection moulding production, as described in EP3878620A1, for example.

As such a coating, which comprises PU polyurethane, can only be applied in the form to be processed via an air-tight cavity in a fully automated injection moulding process owing to the low viscosity, overflow cavities are required in the injection mould to receive the air in the cavity displaced by the coating material. These overflow cavities lead to a moulding on the cover lens. This moulding must be separated after the injection moulding operation and laboriously sealed at the separation point. This results in prolonged process times and a reduced surface finish at the separation point.

SUMMARY OF THE INVENTION

It is therefore an object of the invention to provide a cover lens, an injection moulding process and an injection mould to overcome the aforementioned drawbacks at least in part without substantially affecting the appearance of the cover lens.

This object is achieved with the cover lens mentioned in the introduction, wherein the transparent body, the opaque body and the coating are produced in one continuous piece, preferably in an injection moulding process, in such a way that the outer surface is only formed on the coating and on the opaque body, wherein the coating, as seen from the outer surface in the direction of the inner surface, completely covers the transparent body and only partially covers the opaque body, wherein the area of the coating completely covering the transparent body forms a useful section of the coating and wherein the area of the coating only partially covering the opaque body forms at least one first sub-section of the coating, which first sub-section is formed at least partially in an overflow cavity in the injection process of the coating.

The useful section of the coating, as seen from the outer surface in the direction of the inner surface, advantageously has a thickness between 0.1 mm and 0.9 mm.

The first sub-section of the coating preferably has a thickness that is less than or equal to, preferably equal to the thickness of the useful section of the coating.

In one advantageous embodiment, the area of the coating only partially covering the opaque body also forms a second sub-section, which second sub-section is formed separately from the first sub-section in a gate cavity in the injection process of the coating. This eliminates the need for subsequent separation and sealing of the gate point of the coating.

In order to ensure an optimum condition of the useful section, the second sub-section is preferably formed along the outer surface substantially on an opposite area of the coating.

The opaque body preferably comprises a material which is resistant to at least one outside influence, selected from a group of outside influences, which group comprises influences due to adverse weather conditions, mechanical influences, influences due to sunlight or chemical influences.

For example, a material is resistant to influences due to adverse weather conditions if at least one test, selected from a group of tests comprising DIN EN 60068-2-2, e.g. v2008-05; PV 1200 e.g. v2004-10; PV 3930, e.g. v2008-03; DIN EN ISO 6270-1, e.g. 2018-04 leads to no substantial visible changes, such as colour changes, loss of gloss, cracks or bubbles.

By way of example, a material is resistant to mechanical impacts or influences such as stone chipping if the test according to DIN EN ISO 20567-1, e.g. v2017-07 results in a characteristic value smaller than or equal to 3, preferably smaller than or equal to 2. Alternatively or in addition, the material may be resistant to mechanical impacts and/or influences such as those occurring in a car wash if a certain degree of turbidity as defined in DIN EN ISO 13803, e.g. V2015-02 is smaller than or equal to the degree of turbidity of a reference material according to a test in accordance with DIN EN ISO 20566, e.g. v2021-06. Such a reference material is, for example, the coating material UVKC3000k.

By way of example, the material is resistant to an influence of sunlight and the associated UV exposure if the material has no substantial visible changes, such as colour changes, loss of gloss, cracks or bubbles according to a test, for example in accordance with PV 3930, e.g. v2022-04.

By way of example, a material is resistant to chemical influences if it has no substantial visible changes, such as colour changes, loss of gloss, cracks or bubbles according to a test in accordance with ISO 16750-5, e.g. v2010-04. The chemical substances provided in the test may depend on the "mounting location" of the material. In intended use, those chemical substances that correspond to the "mounting location" [D], i.e. "mounting on exterior", may play a key role.

If a certain number of test cycles can be specified in the aforementioned test standards, at least one single test cycle must be carried out in order to then assess the resistance of the material to be tested to the aforementioned outside influences.

Furthermore, the object of the invention is achieved with an injection moulding process for producing a cover lens for a motor vehicle light, wherein the injection moulding process comprises the following steps: (i) providing an injection mould for forming a first cavity, injection moulding a transparent body in the first cavity, (ii) providing an injection mould for forming a second cavity, (iii) injection moulding an opaque body in the second cavity, wherein either the first cavity is partially delimited by the opaque body or the second cavity is partially delimited by the transparent body in such a way that the transparent body and the opaque body are joined together in one continuous piece during injection moulding, (iv) providing an injection mould for forming a flood cavity, which flood cavity is partially delimited by the transparent body and partially delimited by the opaque body, wherein the opaque body partially delimits at least one overflow cavity, which at least one overflow cavity is part of the flood cavity, (v) injection moulding a coating in the flood cavity by injecting a coating material into the flood cavity, wherein the coating material contains PU polyurethane, wherein during the injection process into the flood cavity, air located in the flood cavity is displaced by the coating material into the at least one overflow cavity, and (vi) demoulding the cover lens.

It may advantageously be provided that during the injection moulding of the coating material into the flood cavity, the flood cavity is filled with the coating material against the force of gravity.

It is advantageously provided that the opaque body is injection moulded from a material or has a material which is resistant to at least one outside influence, selected from a group of outside influences, which group comprises influences due to adverse weather conditions, mechanical influences, influences due to sunlight or chemical influences.

Furthermore, the object of the invention is achieved with an injection mould for producing a cover lens for a motor vehicle light, wherein the injection mould has a first mould half and a second mould half,
- wherein the first mould half is designed to accommodate an injection moulded cover lens blank, which cover lens blank has a transparent body and an opaque body formed in one continuous piece therewith,
- wherein a flood cavity can be formed between the first mould half and the second mould half in closed form, which flood cavity is partially delimited by the second mould half, partially delimited by the transparent body and partially delimited by the opaque body of the cover lens blank that can be accommodated by the first mould half,
- wherein the flood cavity has at least one overflow cavity, which overflow cavity is designed to receive air present in the flood cavity when this is displaced by injection of coating material into the flood cavity,
- wherein the at least one overflow cavity is substantially partially delimited by the second mould half and partially delimited by the opaque body of the cover lens blank that can be accommodated by the first mould half.

It may advantageously be provided that the at least one overflow cavity in the closed form of the mould halves is arranged opposite a flow path of the coating material during injection substantially at the furthest point in relation to a gate point of the coating material from which the flow path starts.

The invention further relates to a motor vehicle light having an aforementioned cover lens or having a cover lens produced by the aforementioned injection moulding process.

The invention further relates to a motor vehicle having such a motor vehicle light.

BRIEF DESCRIPTION OF THE FIGURES

The invention is outlined below based on exemplary and non-limiting figures.

DETAILED DESCRIPTION

The invention will be explained in more detail below with alternate reference to FIG. 1 and FIG. 2.

Figure 1:
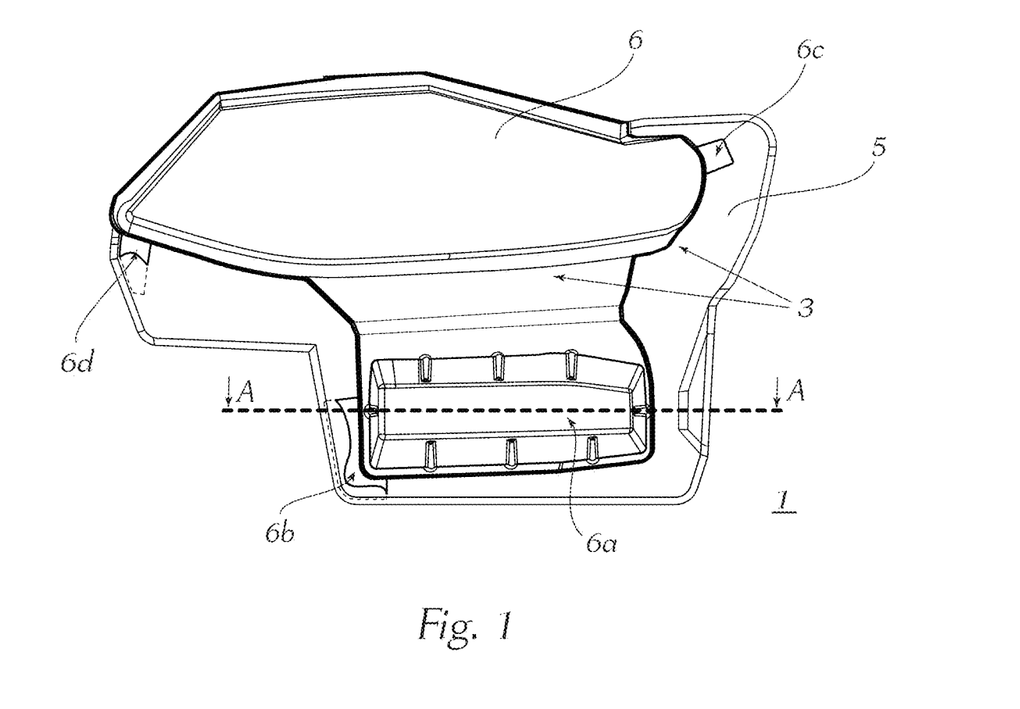
FIG. 1 shows a front view of a cover lens.

FIG. 1 shows a cover lens 1 in orthogonal view from the front. The cover lens 1 has an inner surface 2 and an outer surface 3 opposite the inner surface 2. "Front" therefore refers to a direction from the inner surface 2 to the outer surface 3 of the cover lens 1. In the figure shown, only the outer surface 3 of the cover lens 1 is shown. The outer surface 3 can be defined as the surface part of the cover lens 1 that can be exposed to certain outside influences when the cover lens 1 is installed or used as intended. In contrast, the inner surface 2 of the cover lens 1 can be defined as the surface part that is not exposed to any or at least fewer outside influences when the cover lens 1 is installed or used as intended, as it is protected by a housing 7, for example.

Outside influences may in particular comprise influences due to adverse weather conditions, influences from mechanical impact such as stone chipping, ice scraping or the like, influences due to sunlight or the associated UV exposure, as well as chemical influences such as acids, alcohols, cleaning agents or oils.

Therefore, the cover lens 1 or that surface part of the cover lens 1 that can be exposed to outside influences, i.e. the outer surface 3, must be resistant to at least certain outside influences. Resistance can be assessed using several criteria, for example.

For example, a material is resistant to influences due to adverse weather conditions if at least one test, selected from a group of tests comprising DIN EN 60068-2-2, e.g., v2008-05; PV 1200 e.g. v2004-10; PV 3930, e.g. v2008-03; DIN EN ISO 6270-1, e.g. 2018-04 leads to no substantial visible changes, such as colour changes, loss of gloss, cracks or bubbles.

By way of example, a material is resistant to mechanical impacts or influences such as stone chipping if the test according to DIN EN ISO 20567-1, e.g. v2017-07 results in a characteristic value smaller than or equal to 3, preferably smaller than or equal to 2. Alternatively or in addition, the material may be resistant to mechanical impacts and/or influences such as those occurring in a car wash if a certain degree of turbidity as defined in DIN EN ISO 13803, e.g. V2015-02 is smaller than or equal to the degree of turbidity of a reference material according to a test in accordance with DIN EN ISO 20566, e.g. v2021-06. Such a reference material is, for example, the coating material UVKC3000k.

By way of example, the material is resistant to an influence of sunlight and the associated UV exposure if the material has no substantial visible changes, such as colour changes, loss of gloss, cracks or bubbles according to a test, for example in accordance with PV 3930, e.g. v2022-04.

By way of example, a material is resistant to chemical influences if it has no substantial visible changes, such as colour changes, loss of gloss, cracks or bubbles according to a test in accordance with ISO 16750-5, e.g. v2010-04. The chemical substances provided in the test may depend on the "mounting location" of the material. In expedient use, those chemical substances that correspond to the "mounting location" [D], i.e. "mounting on exterior", may become load-bearing.

If a certain number of test cycles can be specified in the aforementioned test standards, at least one single test cycle must be carried out in order to then assess the resistance of the material to be tested to the aforementioned outside influences.

Alternatively or in addition, certain basic requirements may also become relevant depending on the target market. If the cover lens 1 is used in a motor vehicle light 8, certain ECE, CCC or FMVSS regulations must be observed in relation to resistance to outside influences, for example.

Figure 2:
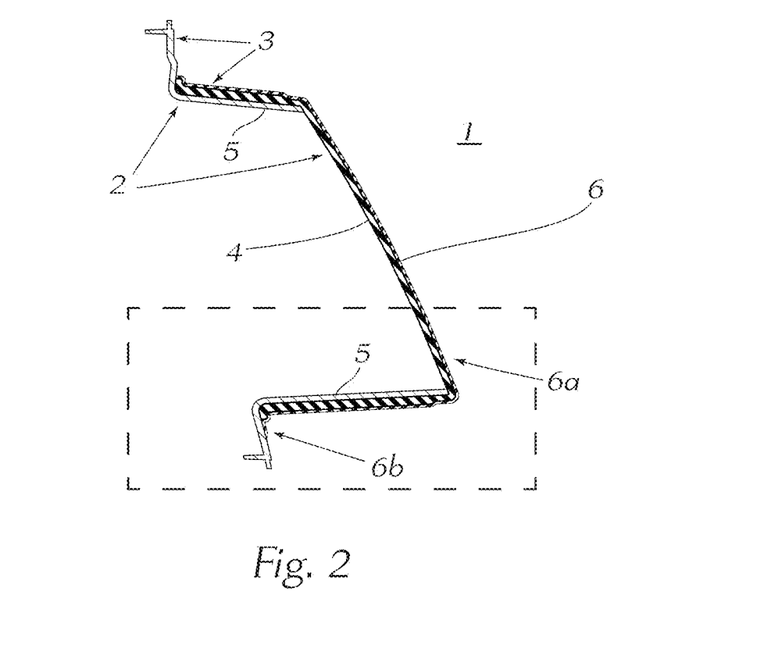
FIG. 2 shows a sectional view of the cover lens.

The cover lens 1 has, as shown in FIG. 2, a transparent body 4, an opaque body 5 and a coating 6. FIG. 2 shows a sectional view along the A-A line shown in FIG. 1. The transparent body 4, the opaque body 5 and the coating 6 form an integral cover lens body between the inner surface 2 and the outer surface 3. In other words, the transparent body, the opaque body 5 and the coating 6 are arranged between the inner surface 2 and the outer surface 3, wherein the inner surface 2 and the outer surface 3 are surface parts of the cover lens 1 and together form the overall surface of the cover lens 3. The cover lens 1 is preferably produced in an injection moulding process. This injection moulding process will be described below.

The coating 6 consists of PU polyurethane or has at least PU polyurethane. The coating 6 is preferably transparent. The coating 6 can be applied using a low-pressure injection moulding process, such as reaction injection moulding. The advantage of such a coating 6 made of PU polyurethane is in particular the ability to smooth out mechanical deformations again, e.g. scratch marks by applying heat to the coating 6. Such heat input can already be sufficiently provided by ambient heat. In particular, sunlight striking the coating 6 can provide corresponding heat input. It is also conceivable for a light source to provide the necessary heat input to the coating 6 of the cover lens 1, for example. For example, appropriately coated scratched material can be stretched again within seconds at 60° C. and thus repair existing scratch marks.

As shown, the outer surface 3 is only formed on the coating 6 and on the opaque body 5. This means that that surface part of the cover lens 1 that can be exposed to outside influences in intended use is only formed by the coating 6 and the opaque body 5. It is a key feature that the outer surface 3 is not formed on the transparent body 4. The transparent body 4 may, for example, consist of PC polycarbonate or PMMA polymethyl methacrylate or at least have these materials. These materials are characterized by high transmittance for light in the visible range and are therefore particularly suitable for use in motor vehicle lights 8. However, these materials are prone to at least some of the aforementioned outside influences and therefore require a corresponding coating 6, which is resistant to one, several or all of the aforementioned influences. The transparent body 4 may also be coloured. For example, the transparent body 4 may be coloured red.

The opaque material 5 may consist of a material or have at least one material, which is resistant to at least one, several or all of the aforementioned outside influences. The opaque body 5 is preferably at least resistant to chemical influence. For example, a thermoplastic terpolymer, preferably ABS acrylonitrile butadiene styrene, is a possible material for the opaque body 5. The opaque body 5 may therefore consist of ABS acrylonitrile butadiene styrene or at least have this material. By way of example, the opaque body 5 may consist of a combination of PC polycarbonate and ABS acrylonitrile butadiene styrene. The opaque body 5 may therefore have a lower transmittance for light than the transparent body 4. Accordingly, "opaque" does not necessarily mean a completely opaque material. Furthermore, the opaque body 5 may also be coloured.

It is possible that less stringent requirements are placed on the opaque body 5 in terms of resistance to outside influences as certain types of resistance are ensured elsewhere. By way of example, the opaque body 5 may be protected from certain outside influences by protective elements, such as the bonnet, cover elements, screens or a bumper, through the intended use of the cover lens 1 in a motor vehicle light 8. For example, such protective elements are designed to protect the opaque body 5 of the cover lens 1 on the outer surface 3 from outside influences such as sunlight and the associated UV exposure, as well as from outside mechanical impacts. When the cover lens 1 is used as intended and in conjunction with the aforementioned protective elements, some of the resistance to outside influences may be dispensed with for that area of the outer surface 3 which is formed by the opaque body 5.

This coating 6 completely covers the transparent body 4, as seen from the outer surface 3 in the direction of the inner surface 2. The opaque body 5 is, as seen from the outer surface 3 in the direction of the inner surface 2, only partially covered by the coating 6. The area of the coating 6 completely covering the transparent body 4 forms a useful section 6a, which useful section 6a is therefore part of the coating 6. Although only one single useful section 6a is shown, a plurality of useful sections is conceivable. In particular in an embodiment with a correspondingly designed opaque body 5, a plurality of transparent windows may be formed, which may result in a plurality of useful sections. On the other hand, the area of the coating 6 only partially covering the opaque body 5, in turn seen from the outer surface 3 in the direction of the inner surface 2, forms sub-sections 6b, 6c, 6d of the coating 6. The area of the coating 6 only partially covering the opaque body 5 therefore forms at least one first sub-section 6b. The first sub-section 6b is formed in an overflow cavity 31 in the injection process of the coating 6.

A section sub-section 6c of the coating 6, which partially covers the opaque body 6, may have been formed in a gate cavity in the injection process of the coating 6. A third sub-section 6d of the coating 6, which partially covers the opaque body 6, may have been formed in a further overflow cavity in the injection process of the coating 6. The injection process comprises injection moulding the coating 6 in a flood cavity 30, which flood cavity 30 has at least one overflow cavity 31.

The surface finish of the first sub-section 6b or of all sub-sections 6b, 6c, 6d may differ from the surface finish of the useful section 6a. For example, the air displaced into the overflow cavity 31 during the injection process of the coating material may lead to meniscus formation (shown in FIG. 1) along the edge region of the first sub-section 6b and the third sub-section 6d. The second sub-section 6c, which is formed in the gate cavity in the injection process of the coating 6, may have a difference in surface finish compared to the useful section 6a due to the gate point. However, the first sub-section 6b or all sub-sections 6b, 6c, 6d are not or only barely discernible to an observer when viewed in the direction from the outer surface 3 to the inner surface 2 as they partially cover the opaque body 5.

Although only a limited number of sub-sections 6b, 6c, 6d is shown, any number of sub-sections may be provided. Further sub-sections are therefore conceivable depending on the geometry and shape of the cover lens 1, i.e. depending on the geometry and shape of the transparent body 5 and the opaque body 5. All sub-sections 6b, 6c, 6d may be connected to one another via the useful section 6a. The sub-sections 6b, 6c, 6b are therefore not directly connected to one another. The useful section 6a and the sub-sections 6b, 6c, 6d together from the coating 6.

As seen from the outer surface 3 in the direction of the inner surface 2, the coating 6 has a certain thickness. This thickness may be between 0.1 mm and 0.9 mm. The thickness of the useful section 6a of the coating 6 is preferably equal at all points of the coating 6.

The first sub-section 6b of the coating 6 also has a thickness that is less than or equal to, but preferably equal to the thickness of the useful section 6a and therefore may also be between 0.1 mm and 0.9 mm. The same may apply to the second sub-section 6c and/or the third sub-section 6d of the coating 6 or to all further sub-sections.

The second sub-section 6c of the coating 6 shown, which is formed separately from the first sub-section 6b in a gate cavity in the injection process of the coating 6, is preferably formed along the outer surface 3 on an opposite area of the coating 6. This results in an improved surface finish of the coating 6, in particular of the useful section 6a of the coating 6.

An exemplary injection moulding process will be explained in more detail below based on FIG. 3A to FIG. 3D. For the sake of clarity, the figures only show the section of the cover lens 1 bordered by dashed lines in FIG. 2.

The injection moulding process comprises a plurality of steps, the order of which does not necessarily have to be same as the one now described. Insofar as logically feasible, the steps may also be carried out in a different order.

Figure 3A:
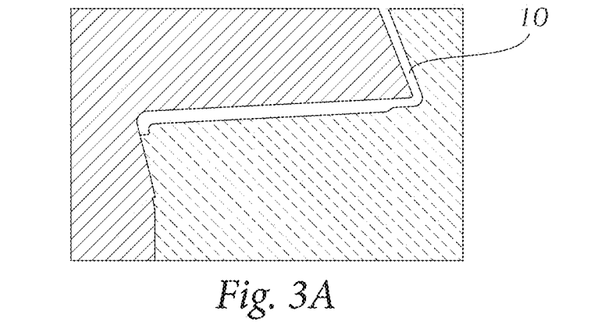
FIG. 3A to FIG. 3D schematically show individual steps of an injection moulding process.

In one step, see FIG. 3A, an injection mould is provided for forming a first cavity 10. A cavity means a largely closed hollow space in which injection moulding material can be injected. The required tightness of the cavity 10 depends on the material to be injected. For example, thermoplastics such as PC polycarbonate, PMMA polymethyl methacrylate or ABS acrylonitrile butadiene styrene allow a lower tightness of the cavity at the edge regions due to their comparatively high viscosity, which means that mould venting can be implemented, for example.

The first cavity 10 is filled with a corresponding injection moulding material in order to produce a transparent body 4. Therefore, the first cavity 10 determines the shape of the transparent body 4 which results from injection moulding in the first cavity 10 and after the injected injection moulding material has hardened. Possible materials for the transparent body 4 have already been mentioned.

Figure 3B:
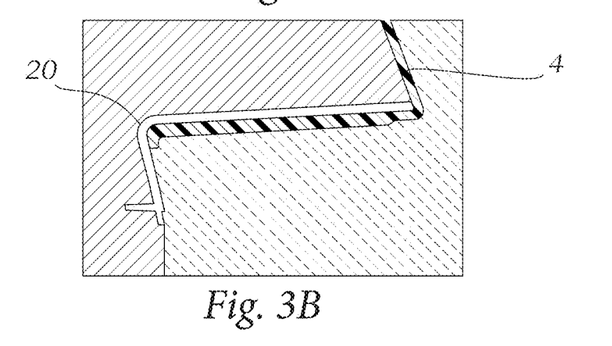

In another step, see FIG. 3B, an injection mould is provided for forming a second cavity 20. The second cavity 20 determines the shape of the opaque body 5 which results from injection moulding in the second cavity 20 and after the injected injection moulding material has hardened. Possible materials for the opaque body 5 have already been mentioned.

In the arrangement shown, the second cavity 20 is partially delimited by the transparent body 4. An embodiment of the injection moulding process in which the opaque body 5 is injection moulded first and then the transparent body 4 is also possible. In this case, the opaque body 5 would partially delimit the first cavity 10. A key feature is that the transparent body 4 and the opaque body 5 are joined together in one continuous piece during the injection moulding process.

Figure 3C:
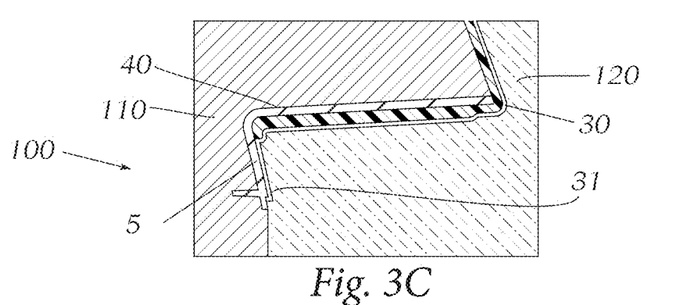

In another step, see FIG. 3C, an injection mould 100 is provided for forming a flood cavity 30. The flood cavity 30 determines the shape of the coating 6 which results from injection moulding in the flood cavity 30 and after the injected coating material has hardened. Although the term "injection moulding" is used here in connection with the coating material, which has PU polyurethane, this process can also be referred to as "flooding". As already mentioned, the coating material may be inserted into the flood cavity 30 by a low-pressure injection moulding process such as reaction injection moulding. The flood cavity 30 is partially delimited by the transparent body 4 and partially delimited by the opaque body 5 such that after injection moulding of the coating 6 into the flood cavity 30, the transparent body 4, the opaque body and the coating 6 are joined together in one continuous piece. In addition, the flood cavity 30 is delimited by the second mould half 120 of the injection mould 100, wherein the first mould half 110 of the injection mould 100 supports the opaque body 5 as well as the transparent body 4 joined in one piece with it. The transparent body 4 and the opaque body 5 joined in one piece with it may be collectively referred to as the injection moulded cover lens blank 40, which is therefore supported by the first mould half 110 or may be accommodated thereby. The flood cavity 30 is preferably at least largely hermetically sealed.

A flood cavity 30 can therefore be formed between the first mould half 110 and the second mould half 120 in closed form of the injection mould 100, as shown, which flood cavity 30 is partially delimited by the second mould half 120, partially delimited by the transparent body 4 and partially delimited by the opaque body 5 of the cover lens blank 40 that can be accommodated by the first mould half 110.

The opaque body 5 partially delimits an overflow cavity 31. This overflow cavity 31 is part of the flood cavity 30, which means that that part of the flood cavity 30 that is only delimited by the transparent body 4 and the second mould half 120 is extended by this overflow cavity 31. The overflow cavity 31 is therefore only delimited by the opaque body 5 and by the second mould half 120, with the exception of the connection to the remaining cavity of the flood cavity 30.

The flood cavity 30 therefore has at least one overflow cavity 31, which overflow cavity 31 is designed to receive air present in the flood cavity 30 when this is displaced by injection of coating material into the flood cavity 30 and possibly compressed.

The cavities 10, 20, 30 may be provided via known multi-component injection moulding processes, for example. Non-limiting options include, for example, reversible plate or rotating plate mechanisms.

The coating 6 is now formed by injecting a coating material into the flood cavity 30. During the injection process, the air present in the flood cavity 30 is displaced by the coating material into the overflow cavity 31, where it may be compressed. Part of the overflow cavity 31 is filled with the coating material. This part will subsequently form the first sub-section 6b of the coating 6. With reference to FIG. 1, it should be noted that projections of the boundaries of the overflow cavities are indicated by dashed lines around the first sub-section 6b and the third sub-section 6d.

The flood cavity 30 is preferably filled with the coating material against the force of gravity in order to achieve an improved surface finish of the coating 6. For this purpose, the injection mould provided for forming the flood cavity 30 may be designed or rotated accordingly.

The injection mould 100 has at least one gate point (not shown) for forming the coating 6 in the flood cavity 30, from which a flow path of the coating material starts during injection moulding of the coating material. A "gate point" may also be understood as a gate area or a gate film. This gate point preferably opens into the aforementioned gate cavity, in which the second sub-section 6c of the coating 6 can be formed. An improved surface finish of the coating 6, in particular of the useful section 6a of the coating 6, is also achieved by virtue of the fact that the overflow cavity 31 in the closed form of the mould halves 110, 120 is arranged opposite this flow path substantially at the furthest point in relation to the gate point. If the injection mould 100 is additionally designed such that the flood cavity 30 can be filled with the coating material against the force of gravity, an optimum surface finish of the coating 6, in particular of the useful section 6a, is achieved.

The volume of the overflow cavity 31 depends on factors such as injection pressure, coating material and the shape of the coating 6. The volume of the overflow cavity 31 is preferably selected such that it can receive all the air present in the flood cavity 30 in the injection process, possibly in compressed form. If a plurality of overflow cavities are provided, the potential volume relates to the overall volume of all overflow cavities.

Figure 3D:
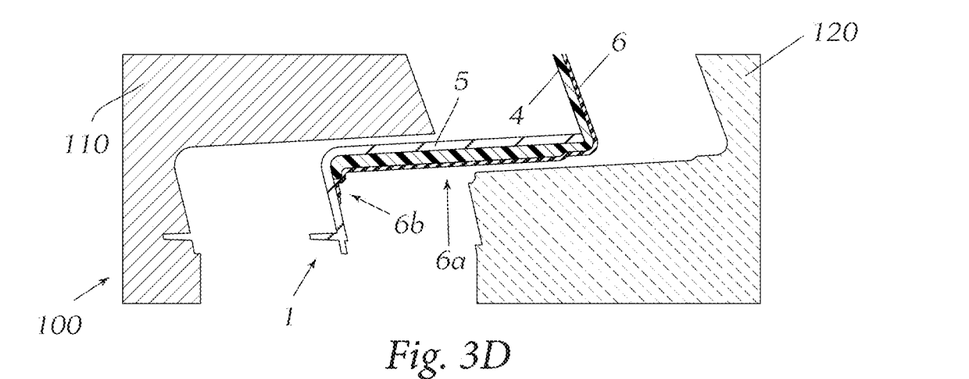

In another, preferably last, step, see FIG. 3D, the cover lens 1 is demoulded. For this purpose, the first mould half 110 and the second mould half 110 are separated and the cover lens 1 ejected. The cover lens 1 having the opaque body 5, the transparent body 4 and the coating 6 may then be connected, for example bonded, to a housing 7, as needed.

Figure 4:
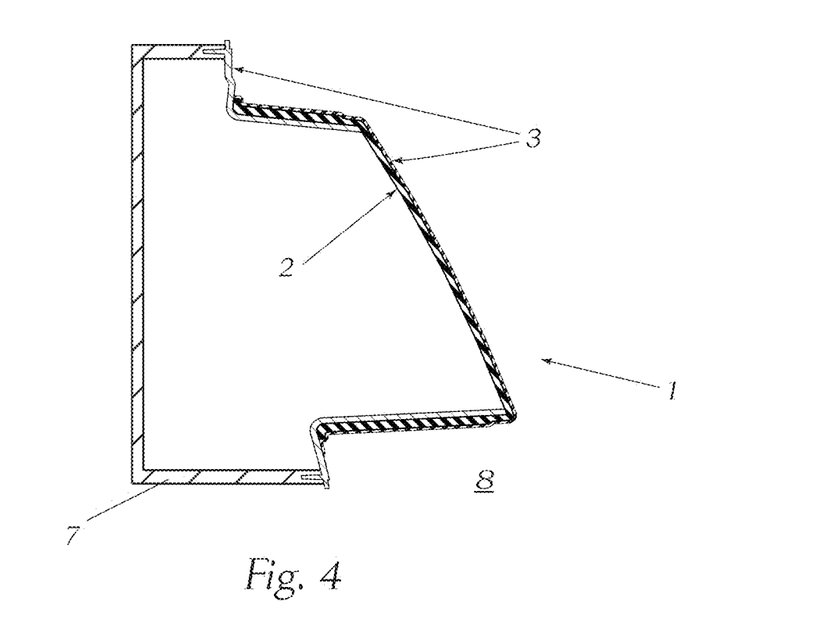
FIG. 4 shows a sectional view of a motor vehicle light.

FIG. 4 shows the cover lens 1 in an intended use in a motor vehicle light 8, wherein the cover lens 1 is connected to a housing 7, which means that the inner surface 2 of the cover lens 1 is protected from one, several or all of the aforementioned outside influences. Light modules, in particular LED light modules may be arranged in the inner region of the motor vehicle light.

Figure 5:
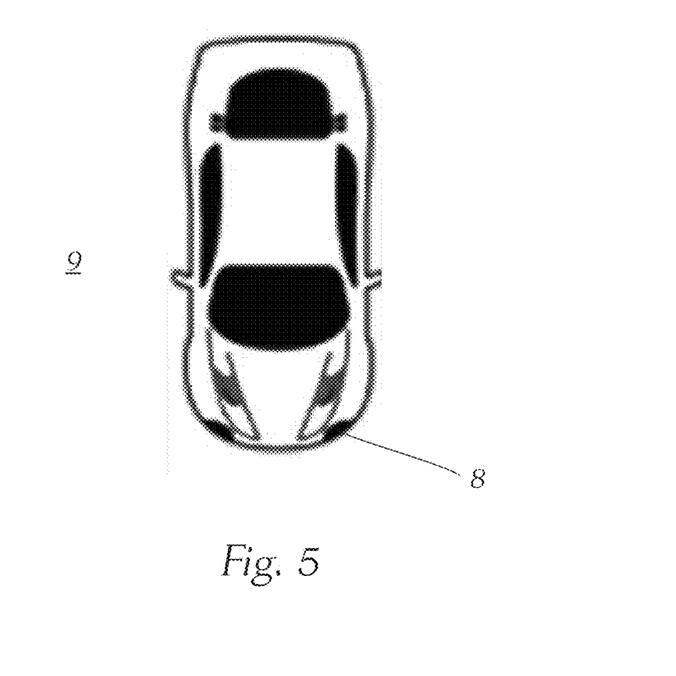
FIG. 5 shows a motor vehicle.

FIG. 5 shows a motor vehicle 9 in which such a motor vehicle light 8 is installed. Such a motor vehicle light 8 may be, for example, a rear light, fog light, signal light or grille illumination device.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

That which is claimed is:

1. A cover lens (1) for a motor vehicle light (8), the cover lens (1) comprising:
   an inner surface (2);
   an outer surface (3) opposite the inner surface (2);
   a transparent body (4);
   an opaque body (5); and
   a coating (6), wherein the coating (6) has PU polyurethane,
   wherein the transparent body (4), the opaque body (5) and the coating (6) are produced in one continuous piece, in such a way that the outer surface (3) is only formed on the coating (6) and on the opaque body (5),
   wherein the coating (6), as seen from the outer surface (3) in a direction of the inner surface (2), completely covers the transparent body (4) and only partially covers the opaque body (5),
   wherein an area of the coating (6) completely covering the transparent body (4) forms a useful section (6a) of the coating and wherein an area of the coating (6) only partially covering the opaque body (5) forms at least one first sub-section (6b) of the coating (6), which first sub-section (6b) is formed at least partially in an overflow cavity (31) in the injection process of the coating (6), and
   wherein the first sub-section (6b) of the coating (6) has a thickness that is less than or equal to a thickness of the useful section (6a) of the coating (6).

2. The cover lens (1) according to claim 1, wherein the useful section (6a) of the coating (6), as seen from the outer surface (3) in the direction of the inner surface (2), has a thickness between 0.1 mm and 0.9 mm.

3. The cover lens (1) according to claim 1, wherein the area of the coating (6) only partially covering the opaque body (5) also forms a second sub-section (6c), which second sub-section (6c) is formed separately from the first sub-section (6b) in a gate cavity in the injection process of the coating (6).

4. The cover lens (1) according to claim 3, wherein the second sub-section (6c) is formed along the outer surface (3) substantially on an opposite area of the coating (6).

5. The cover lens (1) according to claim 1, wherein the opaque body (5) has a material which is resistant to at least one outside influence, selected from a group of outside influences, which group comprises influences due to adverse weather conditions, mechanical influences, influences due to sunlight or chemical influences.

6. A motor vehicle light (8) having a cover lens (1) according to claim 1.

7. The cover lens (1) according to claim 1, wherein the one continuous piece is produced in an injection moulding process.

8. The cover lens (1) according to claim 1, wherein the thickness of first sub-section (6b) of the coating (6) is equal to the thickness of the useful section (6a) of the coating (6).

9. An injection moulding process for producing a cover lens (1) for a motor vehicle light, wherein the injection moulding process comprises the following steps:
   providing an injection mould for forming a first cavity (10);
   injection moulding a transparent body (4) in the first cavity (10);
   providing an injection mould for forming a second cavity (20);
   injection moulding an opaque body (5) in the second cavity (20), wherein either the first cavity (10) is partially delimited by the opaque body (5) or the second cavity (20) is partially delimited by the transparent body (4) in such a way that the transparent body (4) and the opaque body (5) are joined together in one continuous piece during injection moulding;
   providing an injection mould for forming a flood cavity (30), which flood cavity (30) is partially delimited by the transparent body (4) and partially delimited by the opaque body (5), wherein the opaque body (5) partially delimits at least one overflow cavity (31), which at least one overflow cavity (31) is part of the flood cavity (30), injection moulding a coating (6) in the flood cavity (30) by injecting a coating material into the flood cavity (30), wherein the coating material contains PU polyurethane, wherein during the injection process into the flood cavity (30), air located in the flood cavity (30) is displaced by the coating material into the at least one overflow cavity (31); and demoulding the cover lens (1).

10. The injection moulding process according to claim 9, wherein during the injection moulding of the coating material into the flood cavity (30), the flood cavity (30) is filled with the coating material against the force of gravity.

11. The injection moulding process according to claim 9, wherein the opaque body (5) is injection moulded from a material or has a material which is resistant to at least one outside influence, selected from a group of outside influences, which group comprises influences due to adverse weather conditions, mechanical influences, influences due to sunlight or chemical influences.

12. A motor vehicle light (8) having a cover lens (1) produced by the injection moulding process according to claim 9.

13. A motor vehicle (9) having a motor vehicle light (8) according to claim 12.

14. An injection mould (100) for producing a cover lens (1) for a motor vehicle light, the injection mould (100) comprising:

a first mould half (110) and a second mould half (120), wherein the first mould half (110) is designed to accommodate an injection moulded cover lens blank (40), which cover lens blank (40) has a transparent body (4) and an opaque body (5) formed in one continuous piece therewith, wherein a flood cavity (30) can be formed between the first mould half (110) and the second mould half (120) in closed form, which flood cavity (30) is partially delimited by the second mould half (120), partially delimited by the transparent body (4) and partially delimited by the opaque body (5) of the cover lens blank (40) that can be accommodated by the first mould half (110), wherein the flood cavity (30) has at least one overflow cavity (31), which overflow cavity (31) is designed to receive air present in the flood cavity (30) when this is displaced by injection of coating material into the flood cavity (30), wherein the at least one overflow cavity (31) is partially delimited by the second mould half (120) and partially delimited by the opaque body (5) of the cover lens blank (110) that can be accommodated by the first mould half (110).

15. The injection mould (100) according to claim 14, wherein the at least one overflow cavity (31) in the closed form of the mould halves (110, 120) is arranged opposite a flow path of the coating material during injection substantially at the furthest point in relation to a gate point of the coating material from which the flow path starts.

* * * * *